United States Patent
Ito et al.

(10) Patent No.: US 8,177,434 B2
(45) Date of Patent: May 15, 2012

(54) FLUID DYNAMIC BEARING DEVICE

(75) Inventors: Kenji Ito, Kuwana (JP); Yoshiharu Inazuka, Kuwana (JP); Isao Komori, Kuwana (JP); Masaharu Hori, Kuwana (JP); Masaaki Toda, Aichi (JP)

(73) Assignee: NTN Corporation, Osaka-shi (JP)

( * ) Notice: Subject to any disclaimer, the term of this patent is extended or adjusted under 35 U.S.C. 154(b) by 831 days.

(21) Appl. No.: 12/282,057

(22) PCT Filed: Feb. 28, 2007

(86) PCT No.: PCT/JP2007/053728
§ 371 (c)(1),
(2), (4) Date: Sep. 8, 2008

(87) PCT Pub. No.: WO2007/102359
PCT Pub. Date: Sep. 13, 2007

(65) Prior Publication Data
US 2009/0092347 A1    Apr. 9, 2009

(30) Foreign Application Priority Data

Mar. 9, 2006  (JP) ................................ 2006-064506
Apr. 3, 2006  (JP) ................................ 2006-102259

(51) Int. Cl.
*F16C 32/06*    (2006.01)
(52) U.S. Cl. ....................................... 384/107; 384/114
(58) Field of Classification Search .................. 384/100, 384/107, 114
See application file for complete search history.

(56) References Cited

U.S. PATENT DOCUMENTS

| | | | | |
|---|---|---|---|---|
| 5,834,870 A | * | 11/1998 | Tokushima et al. | 384/107 |
| 5,876,124 A | * | 3/1999 | Zang et al. | 384/107 |
| 7,025,505 B2 | * | 4/2006 | Komori et al. | 384/107 |
| 2003/0174911 A1 | * | 9/2003 | Oe | 384/107 |
| 2004/0017954 A1 | | 1/2004 | Komori et al. | |
| 2004/0066992 A1 | * | 4/2004 | Shih et al. | 384/114 |
| 2004/0228552 A1 | * | 11/2004 | Hayashi | 384/107 |
| 2005/0147334 A1 | | 7/2005 | Kanazawa et al. | |
| 2005/0163404 A1 | | 7/2005 | Shishido et al. | |
| 2006/0291757 A1 | * | 12/2006 | LeBlanc et al. | 384/107 |
| 2007/0133912 A1 | * | 6/2007 | Addy | 384/114 |

FOREIGN PATENT DOCUMENTS

CN  1453481 A  11/2003

(Continued)

OTHER PUBLICATIONS

Chinese Office Action dated Sep. 18, 2009, issued in corresponding Chinese Patent Application No. 200780008497.

(Continued)

*Primary Examiner* — Thomas R Hannon
(74) *Attorney, Agent, or Firm* — Westerman, Hattori, Daniels & Adrian, LLP

(57) ABSTRACT

A fluid dynamic bearing device includes a housing injection molded with a bearing sleeve as an insert. Accordingly, the molding of the housing and the assembly of the housing and the bearing sleeve can be performed in a single step. In addition to this, by simply increasing the die precisions the housing and the bearing sleeve can be fixed easily with high precision. Since the housing is opened at both ends, it is possible to sandwich the bearing sleeve, and accordingly, the bearing sleeve can be accurately positioned inside the dies with reliability.

12 Claims, 12 Drawing Sheets

FOREIGN PATENT DOCUMENTS

| | | |
|---|---|---|
| JP | 8-322191 A | 12/1996 |
| JP | 11-155254 A | 6/1999 |
| JP | 11-269475 A | 10/1999 |
| JP | 2003-232353 A | 8/2003 |
| JP | 2003-307227 A | 10/2003 |
| JP | 2004-28174 A | 1/2004 |
| JP | 2004-218804 A | 8/2004 |
| JP | 2005-69382 A | 3/2005 |
| JP | 2005-321089 A | 11/2005 |

OTHER PUBLICATIONS

International Search Report of PCT/JP2007/053728, date of mailing May 29, 2007.

* cited by examiner

FLUID DYNAMIC BEARING DEVICE

TECHNICAL FIELD

The present invention relates to a fluid dynamic bearing device.

BACKGROUND OF THE INVENTION

Fluid dynamic bearing devices are bearing units in which a shaft to be supported is supported with a lubricating film of fluid created in bearing clearances, so as to be capable of relative rotation. These fluid dynamic bearing devices have such characteristics as high-speed rotation, high rotation accuracy, and low noise. Making the best use of those characteristics, they have been widely used in recent years as bearings intended for spindle motors to be mounted on information devices, including magnetic disk drives such as HDD and FDD, optical disc drives such as CD-ROM, CD-R/RW, and DVD-ROM/RAM, and magneto-optical disk drives such as MO, and fan motors to be mounted on personal computers (PC) and the like for the sake of cooling heat sources.

For example, a fluid dynamic bearing device built in a HDD spindle motor has a radial bearing portion for supporting a shaft member in radial directions and a thrust bearing portion for supporting it in thrust directions. The radial bearing portion is often configured as a dynamic bearing which has a dynamic pressure generating portion for generating the dynamic pressure effect of a lubricating fluid in the radial bearing clearance. When the radial bearing portion is configured as a dynamic bearing, dynamic pressure generating grooves are formed in either one of the inner periphery of the bearing sleeve and the outer periphery of the shaft member as the dynamic pressure generating portion (for example, see patent document 1).

The bearing sleeve mentioned above is typically fixed to a predetermined position inside a housing. Concerning this bearing sleeve to be fixed to a housing, a bearing sleeve has been known, for example, which has dynamic pressure generating portions formed at two axially separated positions on its inner periphery (see the foregoing patent document 1). For the purpose of increasing the bearing span between the radial bearing portions further, it has also been known that two bearing sleeves having dynamic pressure generating portions are axially arranged in a row (for example, see patent document 2), and that a spacer (also referred to as a filler piece) is interposed between two bearing sleeves (for example, see patent document 3).

Patent Document 1: Japanese Patent Application Laid-Open No. 2003-232353
Patent document 2: Japanese Patent Application Laid-Open No. Hei 11-269475
Patent document 3: Japanese Patent Application Laid-Open No. Hei 11-155254

SUMMARY OF THE INVENTION

In the foregoing fluid dynamic bearing devices, the assembly precision of the bearing sleeve(s) with respect to the housing governs the width precision of the bearing clearance, or equivalently, the bearing performance directly. The bearing sleeve(s) must therefore be assembled with the housing with high precision. The assembly with high precision is difficult to perform, however, and may entail lower production efficiency with an increase in cost. In particular, when using a plurality of bearing sleeves as in the configurations described in the foregoing patent documents 2 and 3, the positional accuracy between the bearing sleeves (such as coaxiality) also matters in addition to the assembly precision of the bearing sleeves with respect to the housing. Since the housing and the bearing sleeves have respective dimensional tolerances, it is even more difficult to assemble these with high precision, increasing the possibility of higher cost.

An object of the present invention is to increase the assembly precision of the bearing sleeve(s) with respect to the housing, thereby providing a fluid dynamic bearing device capable of exercising high bearing performance at low cost.

To solve the foregoing problems, the present invention provides a fluid dynamic bearing device including: a housing opened at both ends; a bearing sleeve fixed to an inner periphery of the housing; a shaft member inserted into an inner periphery of the bearing sleeve; a flange part formed on the shaft member; and a radial bearing clearance formed between an outer periphery of the shaft member and an inner periphery of the bearing sleeve, a seal space being formed between an outer periphery of the flange part and an inner periphery of the housing, and wherein the housing is injection molded with the bearing sleeve as an insert.

As above, when the housing is injection molded with the bearing sleeve as an insert, it is possible to fix both the members with high precision simply by positioning the bearing sleeve accurately inside the molding die. This can improve the precision of the bearing clearance, and by extension the bearing performance. In particular, since the housing is opened at both ends and the positioning inside the molding die can be performed from both axial sides, it is possible to achieve positioning of higher accuracy. In addition, the step of fixing the housing and the bearing sleeve to each other, which has been necessary heretofore, can be omitted for improved production efficiency.

For example, the bearing sleeve can be positioned inside the molding die so that a predetermined amount of space (clearance) is formed on at least either one side for injection molding, thereby forming a cover part for covering at least one end of the bearing sleeve. According to this configuration, even if the axial dimension of the bearing sleeve varies from one product to another due to machining errors and the like, the variations can be absorbed by the cover part. This makes it possible to ease the machining accuracy required of the bearing sleeve, with a further reduction in the cost of the fluid dynamic bearing device. In addition, the provision of the cover part restricts the axial movement of the bearing sleeve, i.e., the cover part functions as a retainer for the bearing sleeve. An assembled article of high strength can thus be obtained easily.

The ends of the bearing sleeve may face thrust bearing clearances. If those surfaces (hereinafter, referred to as thrust bearing surfaces) have poor surface precision, the thrust bearing clearances can drop in width precision, possibly lowering the bearing performance in the thrust directions. The thrust bearing surfaces must therefore be finished with high precision. Bearing sleeves are often made of sintered metal, whereas sintered metal has a limit in improving the surface precision, and the precision machining of the same results in lower production efficiency and higher cost.

In this respect, a thrust bearing clearance can be formed between the foregoing cover part and the opposed end of the flange part so that the thrust bearing clearance has an improved precision, since the end of the cover part has high precision because of the formation of the cover part by injection molding. In particular, forming the cover part out of resin provides excellent wear resistance as compared to sintered metal and the like. This can suppress wear ascribable to sliding contact with the end of the flange part which is opposed across the thrust bearing clearance, when in low-speed rotations such as when starting and stopping the bearing.

For molding the foregoing cover part, the molding die desirably has a die part corresponding to the shape of a dynamic pressure generating portion in the position corresponding to the end of the cover part so that the dynamic pressure generating portion can be transferred and molded onto the end of the cover part simultaneously with the molding of the cover part.

Now, the fluid dynamic bearing device of this type can sometimes cause a local negative pressure inside the bearing, and the occurrence of such a negative pressure leads to the production of bubbles and vibrations with a drop in bearing performance. This problem can be solved by forming an axial groove in the periphery of the bearing sleeve, such as in the foregoing patent document 1, so as to create a communicating hole that communicates with both ends of the bearing sleeve, thereby providing a circulating channel for the lubricating fluid inside the bearing.

If the bearing sleeve having an axial groove in its outer periphery is used as an insert for injection molding, however, the axial groove will be filled with the injected material. Then, in the present invention, an intermediate member is arranged around the bearing sleeve so that this intermediate sleeve forms a communicating hole that communicates with both ends of the bearing sleeve. With this bearing sleeve and the intermediate sleeve as inserts, the openings at both ends of the communicating hole are sealed with the die, preventing the communicating hole from being filled up.

For another configuration to solve the foregoing problems, the present invention also provides a fluid dynamic bearing device including: a housing; a bearing body fixed to an inner periphery of the housing; and a radial bearing portion for supporting a shaft to be supported radially with a lubricating film of fluid formed in a radial bearing clearance to which a part of an inner periphery of the bearing body is opposed, the bearing body being composed of a plurality of bearing sleeves axially arranged in a row, and wherein the housing is an article having openings in both ends, being injection molded with the bearing body as an insert.

As above, when the housing is injection molded with the bearing body as an insert, the assembly precision between the members can be easily improved by simply increasing the die precision even in such cases that the bearing body is composed of a plurality of bearing sleeves. In particular, when the housing having openings in both ends is injection molded as in the present application, the positioning of the bearing body inside the molding die can be performed from both axial sides, allowing positioning of higher accuracy. Since the molding of the housing and the assembly of the housing and the bearing body can be performed in a single step, it is also possible to lower the manufacturing cost.

For example, the bearing body can be positioned inside the molding die so that a predetermined amount of space is formed on at least either one side for injection molding (insert molding), thereby creating a cover part for covering at least one end of the bearing body. According to this configuration, even if the bearing sleeves constituting the bearing body vary in the axial dimension, the variations can be absorbed by this cover part to provide an assembled article of high precision easily. Since this cover part also functions as a retainer for the sleeve parts, an assembled article of high strength can also be provided easily.

As mentioned above, the fluid dynamic bearing device of this type can sometimes cause a local negative pressure inside the bearing, and the occurrence of such a negative pressure leads to the production of bubbles and vibrations with a drop in bearing performance. This problem can be solved by forming a communicating hole that communicates with both ends of the bearing body, thereby providing a circulating channel for the lubricating fluid inside the bearing.

This type of communicating hole, as in the foregoing patent document 1, can be formed by attaching a bearing sleeve having an axial groove in its outer periphery to the housing. According to the configuration of the present application where the housing is injection molded with the bearing body as an insert, however, the groove will be filled up during injection molding. As means for preventing this, for example, the housing may be injection molded with a pin inserted into the axial groove, followed by the pin being pulled out afterward. Since the communicating hole usually has a hole diameter as small as several hundreds of micrometers or so, however, the pin is likely to break when pulled out. The possibility is even higher for the configuration where the bearing body has an elongated length as in the present application in particular. To avoid such a situation, the communicating hole could be increased in diameter. Nevertheless, the ends of the bearing body and the opposed ends of members may be provided with thrust bearing portions, and this kind of measures, if taken, requires that the bearing areas be designed smaller, possibly causing a drop in the bearing rigidity.

Then, the present invention provides a configuration in which a small diameter part protruding more inward than other locations is formed on an axial area of the housing where the bearing body is fixed, and a communicating hole is formed in this small diameter part. This configuration makes it possible to increase the diameter of the communicating hole without the possibility of lowering the bearing rigidity.

The present invention also provides a configuration comprising an intermediate sleeve for accommodating the bearing body, and wherein a communicating hole is formed between this intermediate sleeve and the bearing body. If the communicating hole is thus formed between the intermediate sleeve and the bearing body, and this assembly is used as an insert, then the openings at both ends of the communicating hole are sealed with the molding die of the housing. This prevents the communicating hole from being filled with the injected material.

The fluid dynamic bearing devices according to the foregoing configurations can be suitably used in motors that have the fluid dynamic bearing devices, stator coils, and rotor magnets, inter alia motors that require particularly high moment rigidity because of high-speed rotations and heavier rotators.

As above, according to the present invention, it is possible to increase the assembly precision of the bearing body with respect to the housing, and thus to provide a fluid dynamic bearing device capable of exercising high bearing performance at low cost.

DETAILED DESCRIPTION OF THE INVENTION

Hereinafter, embodiments of the present invention will be described with reference to the drawings.

Figure 1:
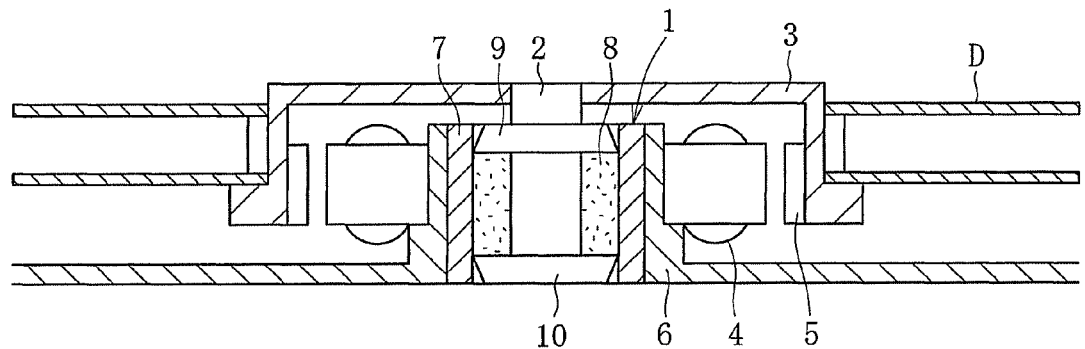
FIG. 1 is a sectional view conceptually showing a first configuration example of an information device spindle motor having a built-in fluid dynamic bearing device.

FIG. 1 conceptually shows a configuration example of a spindle motor intended for information devices, with a built-in fluid dynamic bearing device. This information device spindle motor is used in a HDD or other disk drive, and includes: a fluid dynamic bearing device 1; a rotor (disk hub) 3 which is attached to a shaft member 2 of the fluid dynamic bearing device 1; stator coils 4 and rotor magnets 5 which are opposed to each other, for example, across a radial gap; and a bracket 6. The stator coils 4 are attached to the outer periphery of the bracket 6. The rotor magnets 5 are attached to the inner periphery of the disk hub 3. The disk hub 3 holds one or more disks D such as magnetic disks on its periphery. When the stator coils 4 are energized, the electromagnetic forces occurring between the stator coils 4 and the rotor magnets 5 rotate the rotor magnets 5, whereby the disk hub 3 and the shaft member 2 are rotated integrally.

Figure 2:
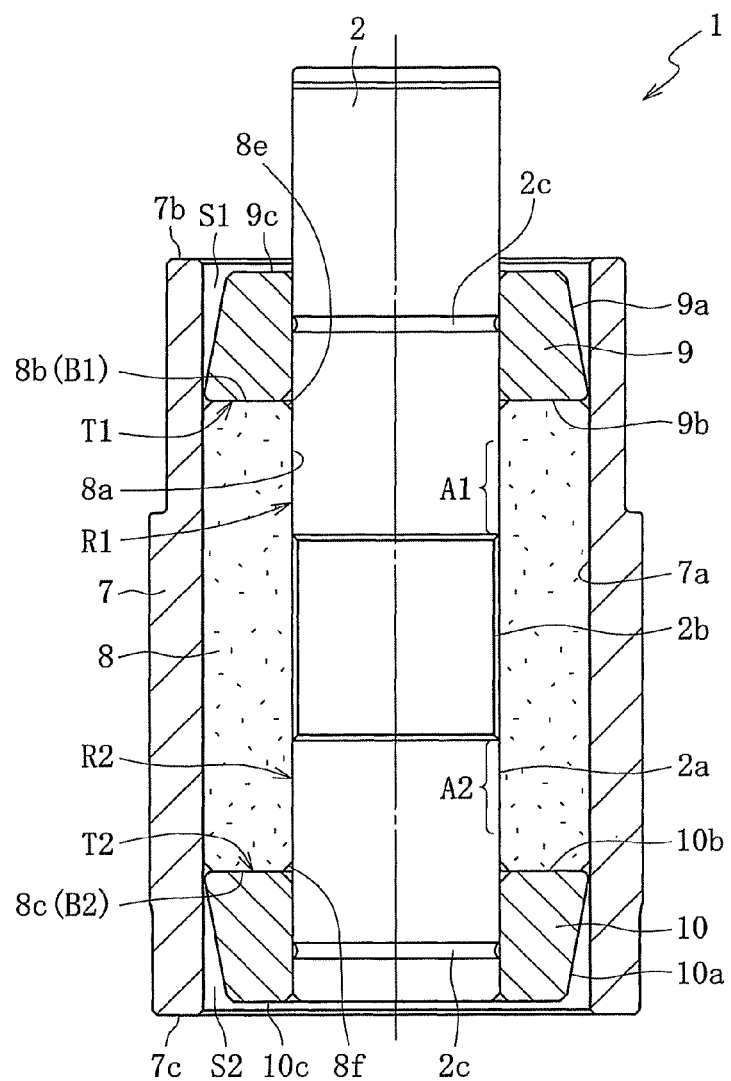
FIG. 2 is a sectional view showing a first configuration example of the fluid dynamic bearing device according to a first embodiment.

FIG. 2 shows in detail the fluid dynamic bearing device 1 which is built in the spindle motor shown in FIG. 1, showing a first configuration example of a first embodiment of the fluid dynamic bearing device according to the present invention. For its primary components, this fluid dynamic bearing device 1 includes: the shaft member 2; flange parts which are formed on the shaft member 2; a bearing sleeve 8 into which the shaft member 2 is inserted; and a housing 7 inside which the bearing sleeve 8 is fixed to. In the configuration of the shown example, a first flange part 9 and a second flange part 10 are arranged at both open ends of the bearing sleeve 8 as the flange parts. For convenience of explanation, the following description will be given with the side where an end of the shaft member 2 protrudes from the opening of the housing 7 as top side, and with the axially opposite side as bottom side.

A first radial bearing portion R1 and a second radial bearing portion R2 are formed between the inner periphery 8*a* of the bearing sleeve 8 and the outer periphery 2*a* of the shaft member 2 so that they are axially separated from each other. In addition, a first thrust bearing portion T1 is formed between the top end 8*b* of the bearing sleeve 8 and the bottom end 9*b* of the first flange part 9. A second thrust bearing portion T2 is formed between the bottom end 8*c* of the bearing sleeve 8 and the top end 10*b* of the second flange part 10.

The shaft member 2 is made of a metal material such as stainless steel, or has a hybrid structure of metal and resin. The entire shaft member 2 is shaped like a shaft of generally uniform diameter, and a relief portion 2*b* of slightly smaller diameter is formed in the midsection. The outer periphery 2*a* of the shaft member 2 has recesses, such as circumferential grooves 2*c*, in the positions where the first and second flange parts 9 and 10 are fixed.

For example, the bearing sleeve 8 is made of a porous body of sintered metal, or a porous body of sintered metal mainly composed of copper in particular, in a cylindrical shape. Note that the bearing sleeve 8 may be made of brass or other soft metal materials aside from sintered metal.

Figure 3:
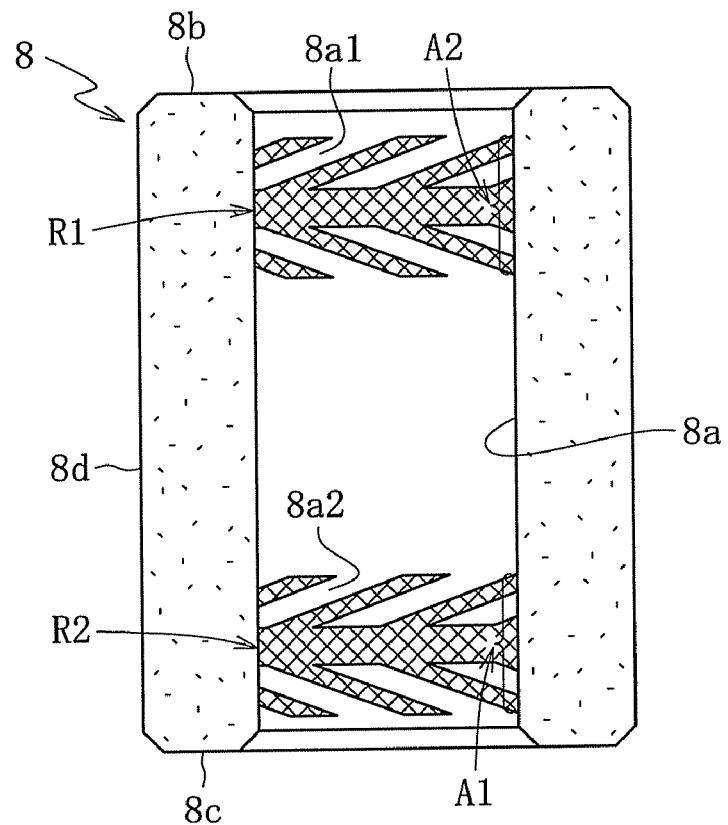
FIG. 3 is a longitudinal sectional view of a bearing sleeve.

The inner periphery 8*a* of the bearing sleeve 8 is provided with top and bottom, two areas where to make a radial bearing surface A1 of the first radial bearing portion R1 and a radial bearing surface A2 of the second radial bearing portion R2 so that they are axially separated from each other. The two areas have respective dynamic pressure generating grooves 8*a*1 and 8*a*2 of herringbone shape such as shown in FIG. 3, for example. Note that the radial bearing surfaces A1 and A2 may be formed on the radially opposite, outer periphery 2*a* of the shaft member 2. A spiral shape or other known shapes may also be employed for the dynamic pressure generating grooves to be formed in the radial bearing surfaces.

Figure 4:
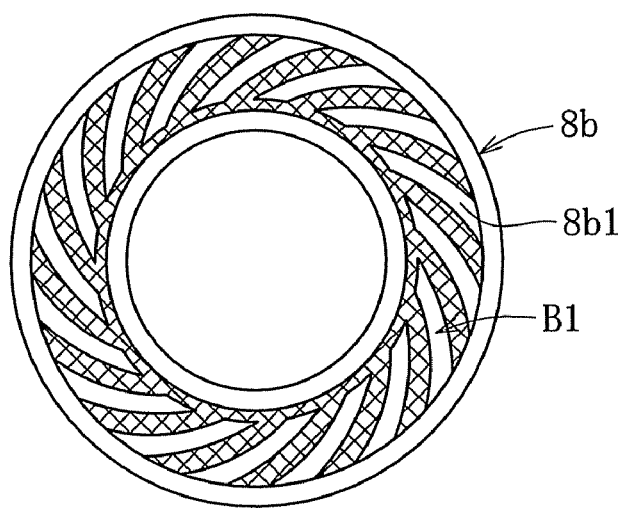
FIG. 4 is a view showing the top end of the bearing sleeve.
Figure 5:
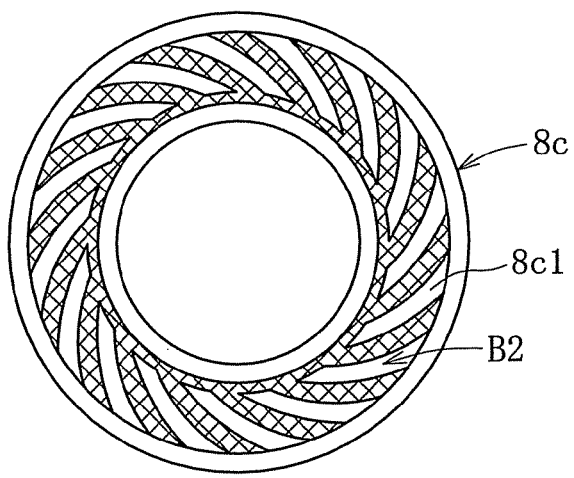
FIG. 5 is a view showing the bottom end of the bearing sleeve.

An area to make a thrust bearing surface B1 of the first thrust bearing portion T1 is formed on part or all of the annular area at the top end 8*b* of the bearing sleeve 8. The area has dynamic pressure generating grooves 8*b*1 of spiral shape such as shown in FIG. 4, for example. In addition, an area to make a thrust bearing surface B2 of the second thrust bearing portion T2 is formed on part or all of the annular area at the bottom end 8*c* of the bearing sleeve 8. The area has dynamic pressure generating grooves 8*c*1 of spiral shape such as shown in FIG. 5, for example. Note that either one or both of the thrust bearing surfaces B1 and B2 may be formed on the bottom end 9*b* of the first flange part 9 and the top end 10*b* of the second flange part 10 which are axially opposite thereto, respectively. A herringbone shape or other known shapes may also be employed for the dynamic pressure generating grooves to be formed in the thrust bearing surfaces.

The housing 7 is formed in a generally cylindrical shape with openings at both ends. Its inner periphery 7*a* forms a straight cylindrical surface of uniform diameter. The outer periphery of the housing 7 is fixed to the inner periphery of the bracket 6 shown in FIG. 1 by such means as press-in, adhesion, and press-in with adhesion.

Figure 6:
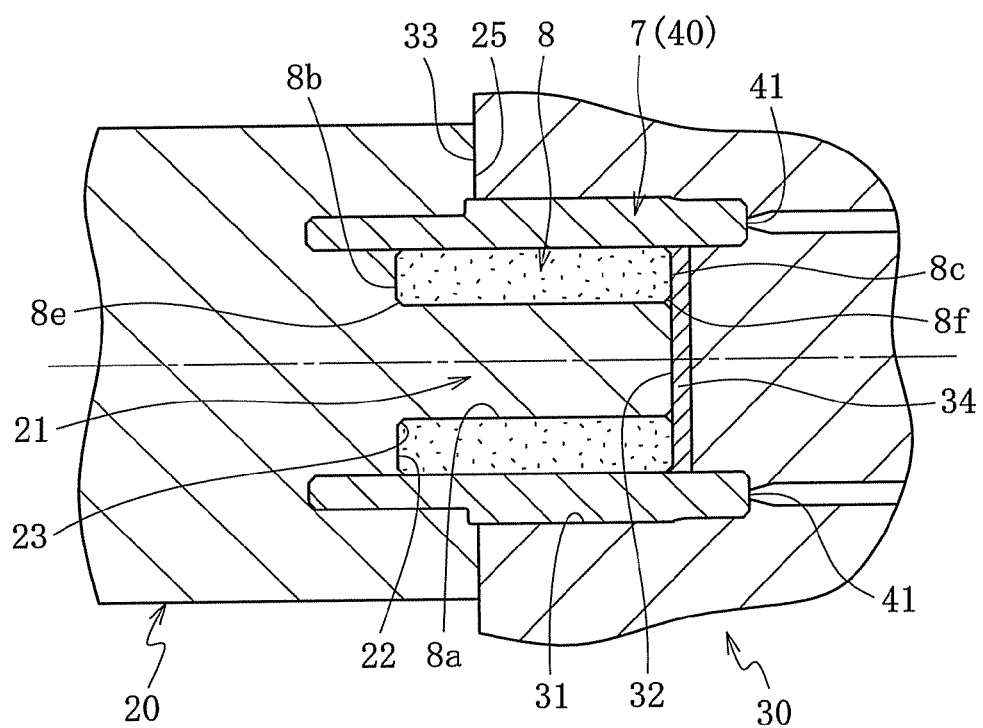
FIG. 6 is a sectional view conceptually showing the step of injection molding a housing.

The housing 7 is injection molded with the bearing sleeve 8 as an insert. In the present embodiment, it is an injection molded article of resin. FIG. 6 shows the process of molding the housing 7. The die here in use is composed of a movable die 20 having a generally cylindrical shaft part 21, and a fixed die 30 having gates 41. When the dies are clamped, i.e., an end 25 of the movable die 20 and an end 33 of the fixed die 30 are put into contact with each other, the movable die 20 and the fixed die 30 create a cavity 40 therebetween. At the time of this clamping, the bearing sleeve 8 is positioned with its inner periphery 8a fitted to the shaft part 21 and with both ends 8b and 8c sandwiched between the movable die 20 and the fixed die 30. In this state, a resin material is injected into the cavity 40 from the gates 41, whereby the housing 7 is molded integrally with the bearing sleeve 8.

Since the housing 7 is thus injection molded with the bearing sleeve 8 as an insert, the step of molding the housing 7 and the step of assembling the housing 7 and the bearing sleeve 8 are completed in a single process, which simplifies the manufacturing.

Moreover, since the housing 7 is opened at both axial ends, the bearing sleeve 8, or insert, can be sandwiched between the dies 20 and 30 from both axial sides during the injection molding of the housing 7. The bearing sleeve 8 can thus be axially positioned inside the cavity 40 with reliability. Consequently, the housing 7 and the bearing sleeve 8 can be fixed to each other accurately as long as the dies 20 and 30 are machined with precision.

During the foregoing clamping, the following problems occur if the axial dimension between both ends 8b and 8c of the bearing sleeve 8 does not coincide with the axial dimension between the dies' contact surfaces 22 and 32 that come into contact with the ends 8b and 8C. For example, if the former is smaller than the latter, the bearing sleeve 8 and the dies leave an axial gap therebetween, precluding proper positioning of the bearing sleeve 8. If the former is greater than the latter, the clamping may cause a large axial pressure on the bearing sleeve 8, possibly deforming the bearing sleeve 8. Such problems can be avoided by machining the dies and the bearing sleeve 8 with precision, whereas it is actually impossible to match the two axial dimensions exactly with each other.

In this regard, according to the present embodiment, as shown in FIG. 6, the contact surface 22 of the movable die 20 and the top end 8b of the bearing sleeve 8 are put into contact with each other so that the bearing sleeve 8 is positioned axially. Meanwhile, the surface 32 of the fixed die 30 for making contact with the bottom end 8c of the bearing sleeve 8 is made of an elastic member 34. This makes it possible for axial dimensional errors between the dies 20 and 30 and the bearing sleeve 8 to be absorbed by the elastic member 34. More specifically, the axial dimension between the contact surfaces 22 and 32 of the dies are set to be slightly smaller than the axial dimension between both ends 8b and 8c of the bearing sleeve 8, so that the elastic member 34 can elastically absorb the dimension error to avoid the foregoing problems.

Now, if a resin member and a metal member are fixed to each other by adhesion or the like, the fixing force between the members is typically weaker, for example, than when metal members are fixed by adhesion. Molding the metal bearing sleeve 8 and the resin housing 7 integrally as above, on the other hand, can improve the fixing force between the two members. In addition, when the bearing sleeve 8 is made of sintered metal or other porous bodies as in the present embodiment, the resin material gets into surface pores of the bearing sleeve 8 for an anchoring effect, which can further improve the fixing force between the two members.

Note that the housing 7 may be an injection molded article of a metal material, instead of the injection molded article of resin as described above. In this case, low melting metal materials such as magnesium alloys and aluminum alloys can be suitably used as the metal material to be injected.

The shaft member 2 is inserted into the inner periphery of the integrally molded article thus formed out of the bearing sleeve 8 and the housing 7, and then the first flange part 9 and the second flange part 10 are fixed to the outer periphery of the shaft member 2. The first flange part 9 and the second flange part 10 are both made of brass or other soft metal materials, or other metal materials, or resin materials, in a ring shape. They are fixed to predetermined positions on the outer periphery 2a of the shaft member 2, for example, by using an adhesive. The adhesive may be a thermosetting adhesive. In this case, the flange parts 9 and 10 can be positioned to the shaft member 2 before the shaft member 2 is heat-treated (baked) to fix the flange parts 9 and 10 to the shaft member 2 with reliability. Here, the adhesive applied to the shaft member 2 is filled into and cured in the circumferential grooves 2c, or adhesive pockets. This improves the adhesive strength of the flange parts 9 and 10 to the shaft member 2.

The outer periphery 9a of the first flange part 9 and the inner periphery 7a at the top opening of the housing 7 create a first seal space S1 of a predetermined capacity therebetween. The outer periphery 10a of the second flange part 10 and the inner periphery 7a at the bottom opening of the housing 7 create a second seal space S2 of a predetermined capacity therebetween. In this embodiment, both the outer periphery 9a of the first flange part 9 and the outer periphery 10a of the second flange part 10 are shaped into tapered surfaces which gradually increase in diameter toward the respective outer sides of the bearing unit. Consequently, both the seal spaces S1 and S2 have a tapered shape such that they gradually decrease in diameter toward each other. When the shaft member 2 is rotated, a lubricating fluid (such as lubricating oil) in both the seal spaces S1 and S2 is drawn into directions where the seal spaces get narrower, by the drawing action from the capillary force and by the drawing action from the centrifugal force during rotation. This prevents leakage of the lubricating oil from inside the housing 7 effectively. For more reliable prevention of the oil leakage, the top end 7b and the bottom end 7c of the housing 7, the top end 9c of the first flange part 9, and the bottom end 10c of the second flange part 10 may be each provided with an oil repellant coating.

The first and second seal spaces S1 and S2 have a buffering function for absorbing a volume change of the lubricating oil filled in the internal space of the housing 7 ascribable to temperature variations. Within the intended range of temperature variations, the oil surfaces remain in the two seal spaces S1 and S2 all the time. To achieve this, the total sum of the capacities of the two seal spaces S1 and S2 is set to be at least greater than the amount of volume change of the lubricating oil filled in the internal space ascribable to temperature variations.

In the present configuration example, the seal spaces S1 and S2 are formed radially outside the flange parts 9 and 10. This can increase the capacities of the seal spaces S1 and S2 as compared to cases where the seal spaces are formed around the shaft member 2. In other words, since the same spatial capacities can be maintained with reduced axial dimensions of the seal spaces S1 and S2, it is possible to reduce the axial dimension of the fluid dynamic bearing device 1. Furthermore, in the present configuration example, the housing 7 for creating the seal spaces S1 and S2 is made of resin. As compared to, for example, a metal housing, the inner periphery 7a thus expands by a greater amount in diameter at high temperatures, increasing the capacities of the seal spaces S. Since the increased seal spaces can absorb a volume change of the lubricating oil due to heat expansion, the capacities of the seal spaces S1 and S2 can be reduced for a further reduction in the axial dimension of the fluid dynamic bearing device 1.

When the assembly is thus completed, the lubricating oil is filled into the internal space of the housing 7 that is sealed by the flange parts 9 and 10, including the internal pores of the bearing sleeve 8.

When the shaft member 2 is rotated, the radial bearing surfaces A1 and A2 formed on the inner periphery 8a of the bearing sleeve 8 are opposed to the outer periphery 2a of the shaft member 2 across respective radial bearing clearances. The thrust bearing surface B1 formed on the top end 8b of the bearing sleeve 8 is opposed to the bottom end 9b of the first flange part 9 across a predetermined thrust bearing clearance. The thrust bearing surface B2 formed on the bottom end 8c of the bearing sleeve 8 is opposed to the top end 10b of the second flange part 10 across a predetermined thrust bearing clearance. With the rotation of the shaft member 2, the oil films occurring in the radial bearing clearances then increase in rigidity due to the dynamic pressure effects of the dynamic pressure generating grooves 8a1 and 8a2 formed in the respective radial bearing surfaces A1 and A2, whereby the shaft member 2 is rotatably supported in the radial direction without contact. This creates the first radial bearing portion R1 and the second radial bearing portion R2 for rotatably supporting the shaft member 2 in the radial direction without contact. At the same time, the oil films occurring in the thrust bearing clearances increase in rigidity due to the dynamic pressure effects of the dynamic pressure generating grooves 8b1 and 8c1 formed in the respective thrust bearing surfaces B1 and B2, whereby the shaft member 2 is rotatably supported in both the thrust directions without contact. This creates the first thrust bearing portion T1 and the second thrust bearing portion T2 for rotatably supporting the shaft member 2 in both the thrust directions without contact.

Up to this point, a detailed description has been given of the first configuration example of the first embodiment of the fluid dynamic bearing device according to the present invention. The present invention is not limited in application to the foregoing configuration example, however. Hereinafter, other configuration examples capable of application of the present invention will be described. In the following description, parts and components having substantially the same configurations and operations as those of the first configuration example will be designated by like reference numerals. A redundant description thereof will be omitted.

Figure 7:
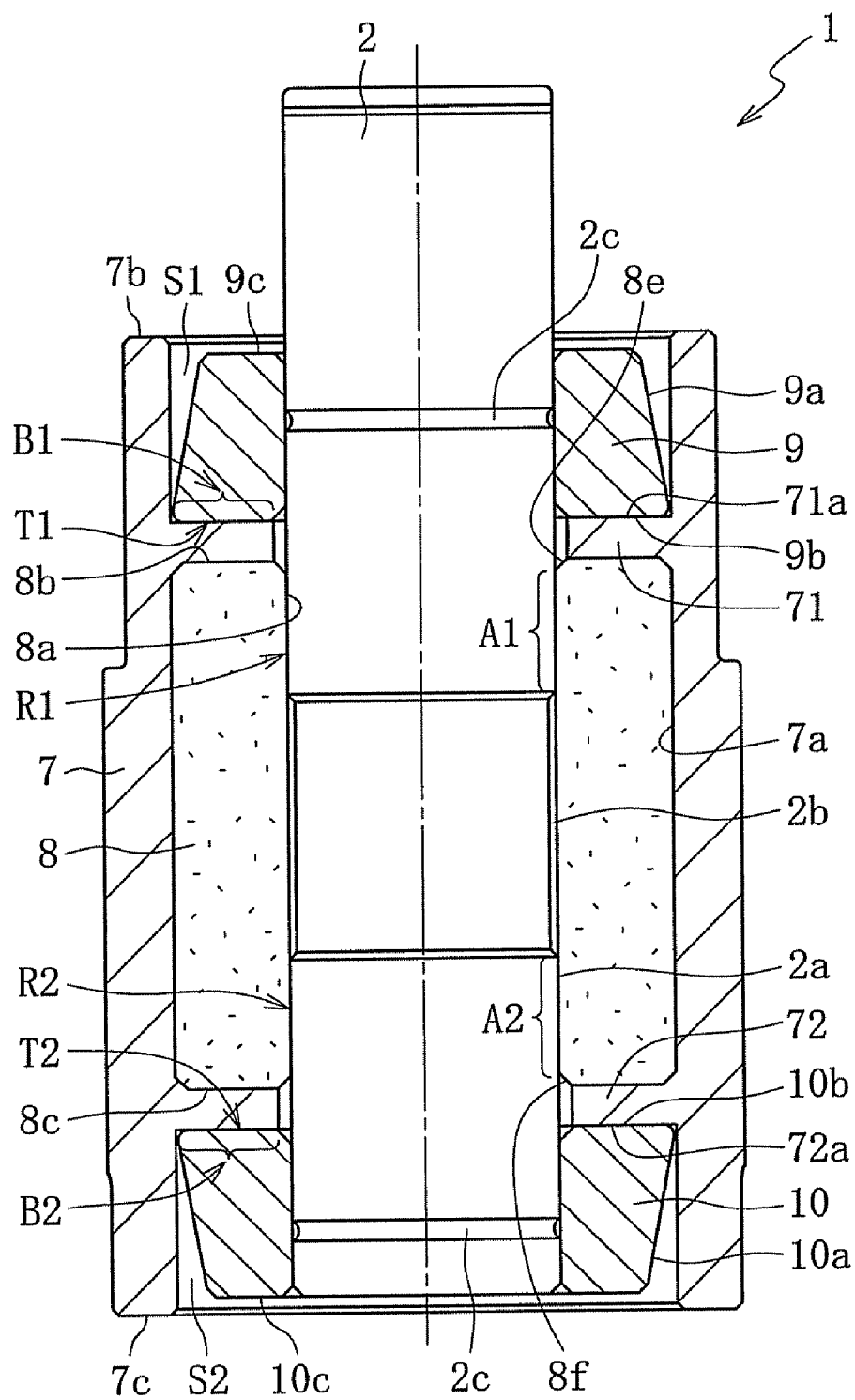
FIG. 7 is a sectional view showing a second configuration example of the fluid dynamic bearing device according to the first embodiment.

FIG. 7 shows a second configuration example of the first embodiment of the fluid dynamic bearing device according to the present invention. The fluid dynamic bearing device 1 shown in the diagram has cover parts 71 and 72 for covering the top end 8b and the bottom end 8c of the bearing sleeve 8. These cover parts 71 and 72 are injection molded out of resin, integrally with (the cylindrical portion of) the housing 7 with the bearing sleeve 8 as an insert. At the time of injection molding, the bearing sleeve 8 is positioned such that chamfered portions 8e and 8f formed along its inner rims at both ends are sandwiched between dies from both axial sides (not shown). The thrust bearing clearance of a first thrust bearing portion T1 is formed between the top end 71a of the cover part 71 and the bottom end 9b of the first flange part 9. The thrust bearing clearance of a second thrust bearing portion T2 is formed between the bottom end 72a of the cover part 72 and the top end 10b of the second flange part 10. In the present configuration example, the top end 71a of the cover part 71 is provided with the same dynamic pressure generating grooves as shown in FIG. 4, so that the area having the dynamic pressure generating grooves makes a thrust bearing surface B1. The bottom end 72a of the cover part 72 is also provided with the same dynamic pressure generating grooves as shown in FIG. 5, so that the area having the dynamic pressure generating grooves makes a thrust bearing surface B2.

As above, according to the present configuration example, the thrust bearing surfaces B1 and B2 are made of resin. This makes it possible to form the thrust bearing surfaces B1 and B2 easily at low cost with high precision. Furthermore, even if the axial dimension of the bearing sleeve 8 varies product by product because of manufacturing errors or the like, the variations can be absorbed by the cover parts 71 and 72. This makes it possible not only to create the thrust bearing clearances with high precision, but also to ease the machining accuracy of the bearing sleeve 8 for cost reduction.

Since the provision of the cover parts 71 and 72 restricts the axial movement of the bearing sleeve 8, the bearing sleeve 8 can be prevented from axially shifting from the housing 7 when the fluid dynamic bearing device 1 undergoes an impact load or the like. In the present embodiment, the cover parts 71 and 72 are formed integrally with the housing 7 through the injection molding with the bearing sleeve 8 as an insert. The cover parts 71 and 72 can thus achieve the axial fixing of the bearing sleeve 8 with higher reliability.

Moreover, the dynamic pressure generating grooves formed in the thrust bearing surface B1 of the cover part 71 and the thrust bearing surface B2 of the cover part 72 can be formed simultaneously with the injection molding of the housing 7 and the cover parts 71 and 72. Specifically, the dynamic pressure generating grooves can be formed simultaneously with the injection molding of the housing 7 if die parts corresponding to the shapes of the dynamic pressure generating grooves are formed on the molding die in positions corresponding to the areas of the top end 71a of the cover part 71 and the bottom end 72a of the cover part 72 for the dynamic pressure generating grooves to be formed in. This makes it possible to form the dynamic pressure generating grooves easily with high precision as compared to the case of forming dynamic pressure generating grooves in metal material by mechanical machining or the like.

In addition, forming the thrust bearing surfaces B1 and B2 out of resin provides excellent wear resistance as compared to the case of forming the thrust bearing surfaces out of sintered metal. This can suppress wear ascribable to sliding contact with the end faces of the flange parts 9 and 10 which are opposed across the thrust bearing clearances, when the fluid dynamic bearing device 1 is in low-speed rotations such as when starting and stopping.

Furthermore, since the bearing sleeve 8 and the cover parts 71 and 72 have a composite structure of sintered metal and resin, it is possible to suppress a difference from the shaft member 2 in the coefficient of linear expansion, for example, as compared to the case where they are all made of resin. This makes it possible to suppress variations in the clearance width of each of the bearing clearances ascribable to thermal expansion or thermal contraction resulting from temperature changes. Consequently, excellent bearing performance can be maintained even if the use environment of the bearing unit changes in temperature.

By the way, the foregoing fluid dynamic bearing device may sometimes cause a local negative pressure inside the bearing, and the occurrence of such a negative pressure produces bubbles and vibrations with a drop in bearing performance. This problem can be solved by forming a communicating hole that communicates with both ends of the bearing sleeve 8, thereby providing a circulating channel for the lubricating fluid inside the bearing.

This communicating hole may be formed, for example, by making one or more axial grooves 8d1 in the outer periphery 8d of the bearing sleeve 8 so as to open to both ends 8b and 8c.

If the housing 7 is injection molded, with the bearing sleeve 8 having the axial groove(s) 8d1 as an insert, then the axial groove(s) 8d1 will be filled with the injected material (resin here).

Figure 8:
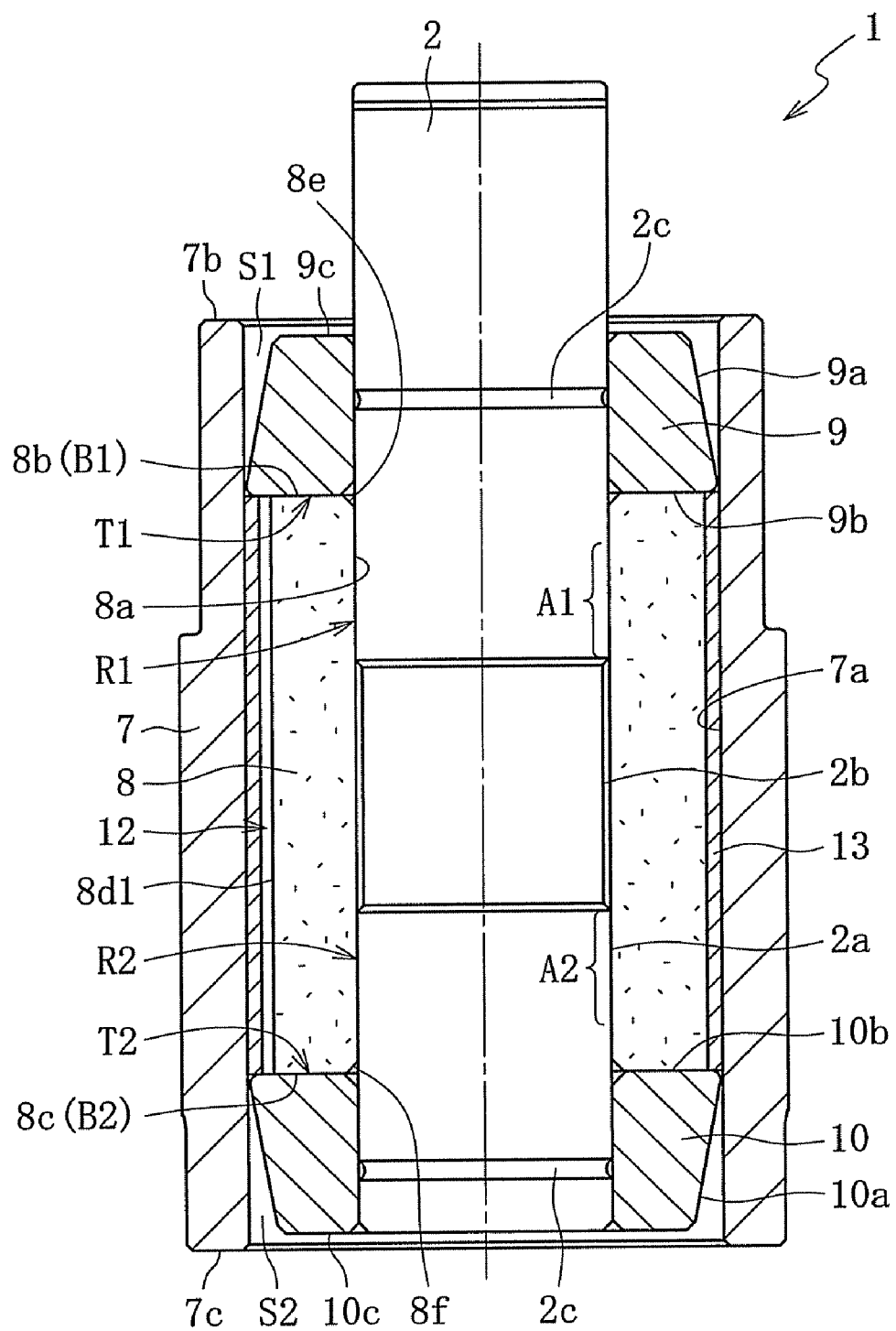
FIG. 8 is a sectional view showing a third configuration example of the fluid dynamic bearing device according to the first embodiment.

This problem can be avoided by not exposing the axial groove(s) to the outer periphery of the bearing sleeve 8. For example, the fluid dynamic bearing device 1 shown in FIG. 8 has an intermediate sleeve 13 which is fitted onto the bearing sleeve 8 having an axial groove 8d1 in its outer periphery, so that this intermediate sleeve 13 and the axial groove 8d1 create a communicating hole 12. When injection molding is performed with this bearing sleeve 8 and the intermediate sleeve 13 as inserts, the communicating hole 12 will not be filled with the resin since both end openings of the communicating hole 12 are closed with the dies. Note that the bearing sleeve 8 may have a cylindrical outer periphery while the axial groove is formed in the inner periphery of the intermediate sleeve 13.

Alternatively, the communicating hole 12 may be formed inside the bearing sleeve 8 to prevent the communicating hole 12 from being filled with resin.

Otherwise, in order to avoid the foregoing problem, an axial groove 8d1 is formed in the outer periphery of the bearing sleeve 8. A molding pin having the shape corresponding to that of the axial groove 8d1 is fitted to the axial groove 8d1, in which state the injection molding can be performed to avoid resin intrusion. Such a molding pin may be formed integrally with or separately from the molding die of the housing 7.

It should be noted that, when the communicating hole 12 is formed as described above, the dynamic pressure generating grooves 8a1 in the radial bearing surface A1, for example, may be formed in an axially asymmetric shape so that the lubricating oil filled inside the bearing is circulated forcefully (not shown).

In the fluid dynamic bearing device 1 described above, the flange parts are formed at the two axial positions of the shaft member 2, whereas a flange part may be formed at one axial position alone.

Moreover, in the foregoing configuration example of the fluid dynamic bearing device 1, the dynamic pressure generating portions for forming the radial bearing portions R1 and R2 and the thrust bearing portions T1 and T2 as dynamic bearings employ the dynamic pressure generating grooves of herringbone shape or spiral shape. Nevertheless, the dynamic pressure generating portions are not limited to these shapes. For example, either one or both of the radial bearing portions R1 and R2 may be configured as so-called multilobe bearings, step bearings, or tapered bearings. Either one or both of the thrust bearing portions T1 and T2 may also be configured as so-called step bearings or wave bearings. Moreover, either one or both of the radial bearing portions R1 and R2 may be configured as so-called cylindrical bearings which have no dynamic pressure generating portion. The thrust bearing portions may be configured as a so-called pivot bearing which supports one end of the shaft member by contact.

In the foregoing description, the lubricating oil has been exemplified as the lubricating fluid to be filled into the interior of the fluid dynamic bearing device 1. Nevertheless, other fluids capable of generating a dynamic pressure effect in the bearing clearances may also be used, including gases such as air, flowable lubricants such as magnetic fluids, and lubricating grease.

Figure 9:
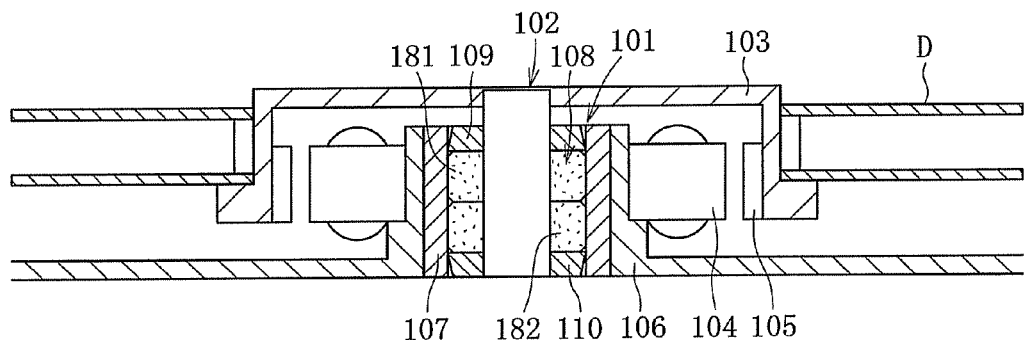
FIG. 9 is a sectional view conceptually showing a second configuration example of the information device spindle motor having a built-in fluid dynamic bearing device.

FIG. 9 conceptually shows a second configuration example of the information device spindle motor having a built-in fluid dynamic bearing device. This spindle motor is used in a HDD or other disk drive, and includes: a fluid dynamic bearing device 101 which rotatably supports a shaft member 102; a rotor (disk hub) 103 which is mounted on the shaft member 102; and stator coils 104 and rotor magnets 105 which are opposed to each other, for example, across a radial gap. The stator coils 104 are attached to the outer periphery of a bracket 106. The rotor magnets 105 are attached to the inner periphery of the disk hub 103. A housing 107 of the fluid dynamic bearing device 101 is attached to the inner periphery of the bracket 106. The disk hub 103 holds one or more disks D such as a magnetic disk. When the stator coils 104 are energized, the electromagnetic forces between the stator coils 104 and the rotor magnets 105 rotate the rotor magnets 105, whereby the disk hub 103 and the shaft member 102 are rotated integrally.

Figure 10:
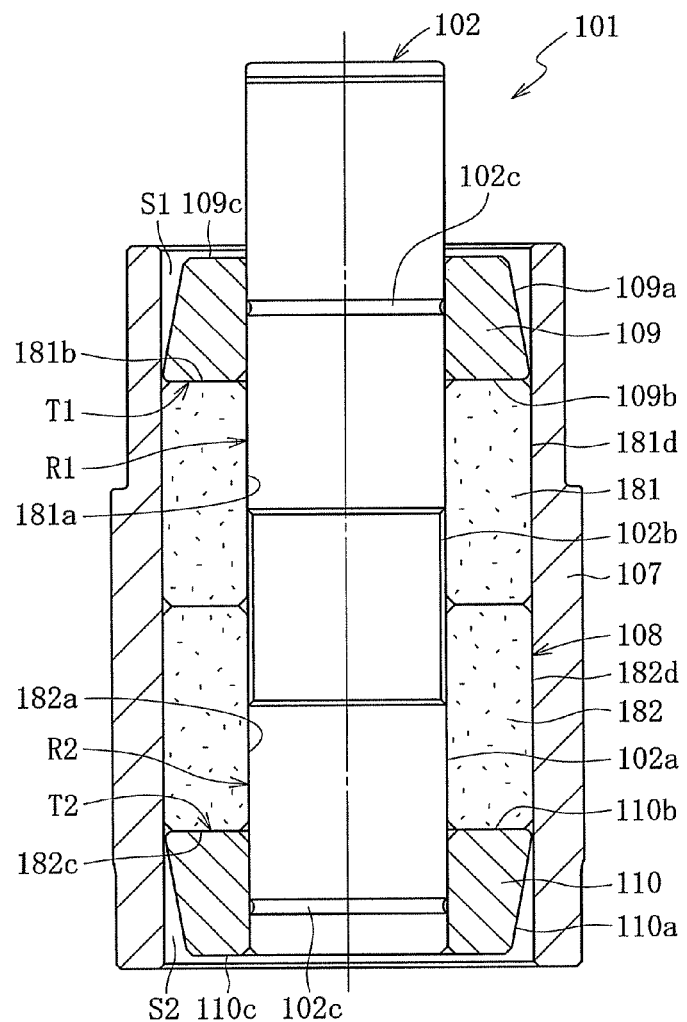
FIG. 10 is a sectional view showing a first configuration example of the fluid dynamic bearing device according to a second embodiment.

FIG. 10 shows the fluid dynamic bearing device 101 that is built in the spindle motor shown in FIG. 9, showing a first configuration example of a second embodiment of the fluid dynamic bearing device according to the present invention. This fluid dynamic bearing device 101 includes, as its primary components, the shaft member 102 on the rotating side, the housing 107 on the stationary side, and a bearing body 108 which is fixed to the inner periphery of the housing 107. In the shown example, the bearing body 108 is composed of a first bearing sleeve 181 and a second bearing sleeve 182 which are axially arranged in a row. For convenience of explanation, the following description will be given with the side where an end of the shaft member 102 protrudes from the opening of the housing 107 as top side, and with the axially opposite side as bottom side.

The shaft member 102 is made of a metal material such as stainless steel, or has a hybrid structure of metal and resin. The entire shaft member 102 is shaped like a shaft of generally uniform diameter, with a relief portion 102b of slightly smaller diameter in the midsection. The outer periphery 102a of the shaft member 102 has recesses, such as circumferential grooves 102c, in positions where first and second flange parts 109 and 110 are fixed.

The bearing sleeves 181 and 182 which constitute the bearing body 108 are both made of a porous body of sintered metal, or a porous body of sintered metal mainly composed of copper in particular, in a cylindrical shape. The two bearing sleeves 181 and 182 shown in the diagram are formed in the same axial length. Either one or both of the bearing sleeves 181 and 182 may be made of soft metal such as brass.

The inner periphery 181a of the first bearing sleeve 181 arranged on the axial top side of the bearing body 108 is provided with an area to make a radial bearing surface A1 of a first radial bearing portion R1. For its dynamic pressure generating portion, the area to make the radial bearing surface A1 has dynamic pressure generating grooves 181a1 of herringbone shape such as shown in FIG. 11(B), for example. The dynamic pressure generating grooves 181a1 are defined and formed by bank portions 181a2 arranged between the grooves. The radial bearing surface A1 of the first bearing sleeve 181 is formed at an end farther from the second bearing sleeve 182 (top side). The inner periphery 182a of the second bearing sleeve 182 lying on the bottom side of the bearing body 108 is provided with an area to make a radial bearing surface A2 of a second radial bearing portion R2. For its dynamic pressure generating portion, the area to make the radial bearing surface A2 has dynamic pressure generating grooves 182a1 of herringbone shape such as shown in FIG. 11(B), for example. The dynamic pressure generating grooves 182a1 are defined and formed by bank portions 182a2 arranged between the grooves. The radial bearing surface A2 of the second bearing sleeve 182 is formed at an end farther from the first bearing sleeve 181 (bottom side).

Note that in the shown example, the dynamic pressure generating grooves 181a1 and 182a1 both have a symmetrical shape about their axial centers. Nevertheless, for example, the upper dynamic pressure generating grooves 181a1 may be configured so that the grooves lying above the axial center have an axial width greater than that of the grooves lying below. This gives an axially downward pressing force (pumping force) to the lubricating oil when the shaft member 102 is rotated. The dynamic pressure generating grooves 181a1 and 182a1 may be formed in the radially opposite, outer periphery 102a of the shaft member 102. They may also be formed in other known shapes such as a spiral shape.

A thrust bearing surface B1 of a first thrust bearing portion T1 is formed on part or all of the annular area at the top end 181b of the first bearing sleeve 181. This thrust bearing surface B1 has dynamic pressure generating grooves 181b1 of spiral shape such as shown in FIG. 11(A), for example. A thrust bearing surface B2 of a second thrust bearing portion T2 is formed on part or all of the annular area at the bottom end 182c of the second bearing sleeve 182. This thrust bearing surface B2 has dynamic pressure generating grooves 182c1 of spiral shape such as shown in FIG. 11(C), for example. Either one or both of the dynamic pressure generating grooves 181b1 and 182c1 formed in the thrust bearing surfaces B1 and B2 may be formed in the bottom end 109b of the first flange part 109 and the top end 110b of the second flange part 110 which are axially opposed thereto. They may also be formed in other known shapes such as a herringbone shape, for example.

The housing 107 is formed in a generally cylindrical shape with openings at both ends. Its inner periphery 107a is formed as a straight cylindrical surface of uniform diameter. The outer periphery of the housing 107 is fixed to the inner periphery of the bracket 106 shown in FIG. 9 by such means as press-in, adhesion, and press-in with adhesion.

For example, this housing 107 is injection molded with the first and second bearing sleeves 181 and 182 (bearing body 108) as inserts, the two radial bearing surfaces A1 and A2 (bank portions 181a2 and 182a2) being coaxially arranged by pressing a fast pin into the inner peripheries. Available injected materials include resin materials, aside from low melting metal materials such as aluminum alloys and magnesium alloys. In the present configuration example, a resin material is used for the injection molding. The base resin is not limited in particular as long as it is capable of injection molding. For example, crystalline resins including liquid crystal polymer (LCP), polyphenylene sulfide (PPS), and polyether ether ketone (PEEK), and amorphous resins including polysulfone (PSU), polyethersulfone (PES), and polyphenylsulfone (PPSU) are available as well. Depending on the required properties, the base resin may contain one, or two or more of various fillers including reinforcing agents, conductive agents, and lubricants.

The first flange part 109 and the second flange part 110 are both made of brass or other soft metal materials, or other metal materials, or resin materials, in a ring shape. They are fixed to the outer periphery 102a of the shaft member 102, for example, by adhesion. When fixed by adhesion, the adhesive applied to the shaft member 102 is filled into and cured in the circumferential grooves 102c, or adhesive pockets. This improves the adhesive strength of the flange parts 109 and 110 to the shaft member 102.

The outer periphery 109a of the first flange part 109 and the inner periphery 107a at the top opening of the housing 107 create a first seal space S1 of a predetermined capacity therebetween. The outer periphery 110a of the second flange part 110 and the inner periphery 107a at the bottom opening of the housing 107 create a second seal space S2 of a predetermined capacity therebetween. In the shown example, both the outer periphery 109a of the first flange part 109 and the outer periphery 110a of the second flange part 110 are shaped into tapered surfaces which gradually decrease in diameter toward the respective outer sides of the bearing unit. Consequently, both the seal spaces S1 and S2 have a tapered shape such that they gradually decrease in diameter toward each other (toward the inside of the housing 107). When the shaft member 102 is rotated, the lubricating fluid (such as lubricating oil) in both the seal spaces S1 and S2 is drawn into directions where the seal spaces get narrower (toward the inside of the housing 107), by the drawing action from the capillary force and by the drawing action from the centrifugal force during rotation. This consequently prevents leakage of the lubricating oil from inside the housing 107 effectively. For reliable prevention of the oil leakage, the top and bottom ends of the housing 107, the top end 109c of the first flange part 109, and the bottom end 110c of the second flange part 110 may be each provided with an oil repellant coating (not shown).

The first and second seal spaces S1 and S2 have a buffering function for absorbing a volume change of the lubricating oil filled in the internal space of the housing 107 ascribable to temperature variations. Within the intended range of temperature variations, the oil surfaces remain in the two seal spaces S1 and S2 all the time. To achieve this, the total sum of the capacities of the two seal spaces S1 and S2 is set to be at least greater than the amount of volume change of the lubricating oil filled in the internal space ascribable to temperature variations.

The fluid dynamic bearing device 101 having the foregoing configuration is assembled, for example, in the following manner.

With the housing 107 and the bearing body 108 molded integrally, the shaft member 102 is inserted into the inner periphery of the bearing body 108. Then, the first flange part 109 and the second flange part 110 are fixed to around the circumferential grooves 102c of the shaft member 102, leaving a predetermined axial gap, so that the bearing body 108 is sandwiched therebetween. When the assembly of the fluid dynamic bearing device 101 is thus completed, the lubricating oil is filled into the internal space of the housing 107 that is sealed by the two flange parts 109 and 110, including the internal pores of the bearing sleeves 181 and 182.

In the fluid dynamic bearing device 101 of the foregoing configuration, when the shaft member 102 is rotated, the radial bearing surface A1 on the inner periphery 181a of the first bearing sleeve 181 and the radial bearing surface A2 of the second bearing sleeve 182 are opposed to the outer periphery 102a of the shaft member 102 across respective radial bearing clearances. With the rotation of the shaft member 102, the oil films occurring in the radial bearing clearances then increase in rigidity due to the dynamic pressure effects of the dynamic pressure generating grooves 181a1 and 182a1 formed in the respective radial bearing surfaces, whereby the shaft member 102 is rotatably supported in the radial direction without contact. This creates the first radial bearing portion R1 and the second radial bearing portion R2 for rotatably supporting the shaft member 102 in the radial direction without contact so that they are axially separated from each other.

Moreover, when the shaft member 102 is rotated, the area of the top end 181b of the first bearing sleeve 181 where to make the thrust bearing surface B1 is opposed to the bottom end 109b of the first flange part 109 across a predetermined thrust bearing clearance. The area of the bottom end 182c of the second bearing sleeve 182 where to make the thrust bearing surface B2 is opposed to the top end 110b of the second flange part 110 across a predetermined thrust bearing clearance. With the rotation of the shaft member 102, the oil films occurring in the respective thrust bearing clearances then increase in rigidity due to the dynamic pressure effects of the dynamic pressure generating grooves 181b1 and 182c1 formed in the respective thrust bearing surfaces B1 and B2, whereby the shaft member 102 is rotatably supported in both the thrust directions without contact. This creates the first thrust bearing portion T1 and the second thrust bearing portion T2 for rotatably supporting the shaft member 102 in both the thrust directions without contact.

In the fluid dynamic bearing device 101 described above, the housing 107 is injection molded with the bearing body 108 as an insert. Even if the bearing body 108 is made of a plurality of bearing sleeves 181 and 182 and it is difficult to provide desired assembly precision, the insert molding makes it possible to improve the assembly precision between the bearing sleeves 181 and 182 and the assembly precision of the bearing body 108 to the housing 107 as well by simply increasing the die precisions. In particular, since the housing 107 is opened at both ends, it is possible to sandwich the bearing body 108, the insert, from both axial sides for more accurate positioning. Furthermore, since the molding of the housing 107 and the assembly of the housing 107 and the bearing body 108 can be performed in a single step, it is possible to lower the manufacturing cost.

Moreover, when the housing 107 is injection molded with the bearing body 108 as an insert, the bonding force between the housing 107 and the bearing body 108 can be increased easily as compared to the cases where the bearing body 108 is attached to the housing 107 by adhesion, press-in, or other means. In particular, when the first and second bearing sleeves 181 and 182 which constitute the bearing body 108 are made of sintered metal, the injected material gets into the surface pores of the bearing sleeves 181 and 182. The bonding force therebetween can thus be enhanced further by a so-called anchoring effect.

Although not shown in the drawings, the bracket 106 may also be molded integrally with the housing 107 for a further reduction in cost.

Furthermore, as compared to the configuration (for example, see patent document 1) where the thrust bearing portions are formed on both sides of a flange part that is formed at one end of the shaft member, the configuration shown in FIG. 10 allows a greater axial spacing between the thrust bearing portions. This allows higher moment rigidity.

Figure 12:
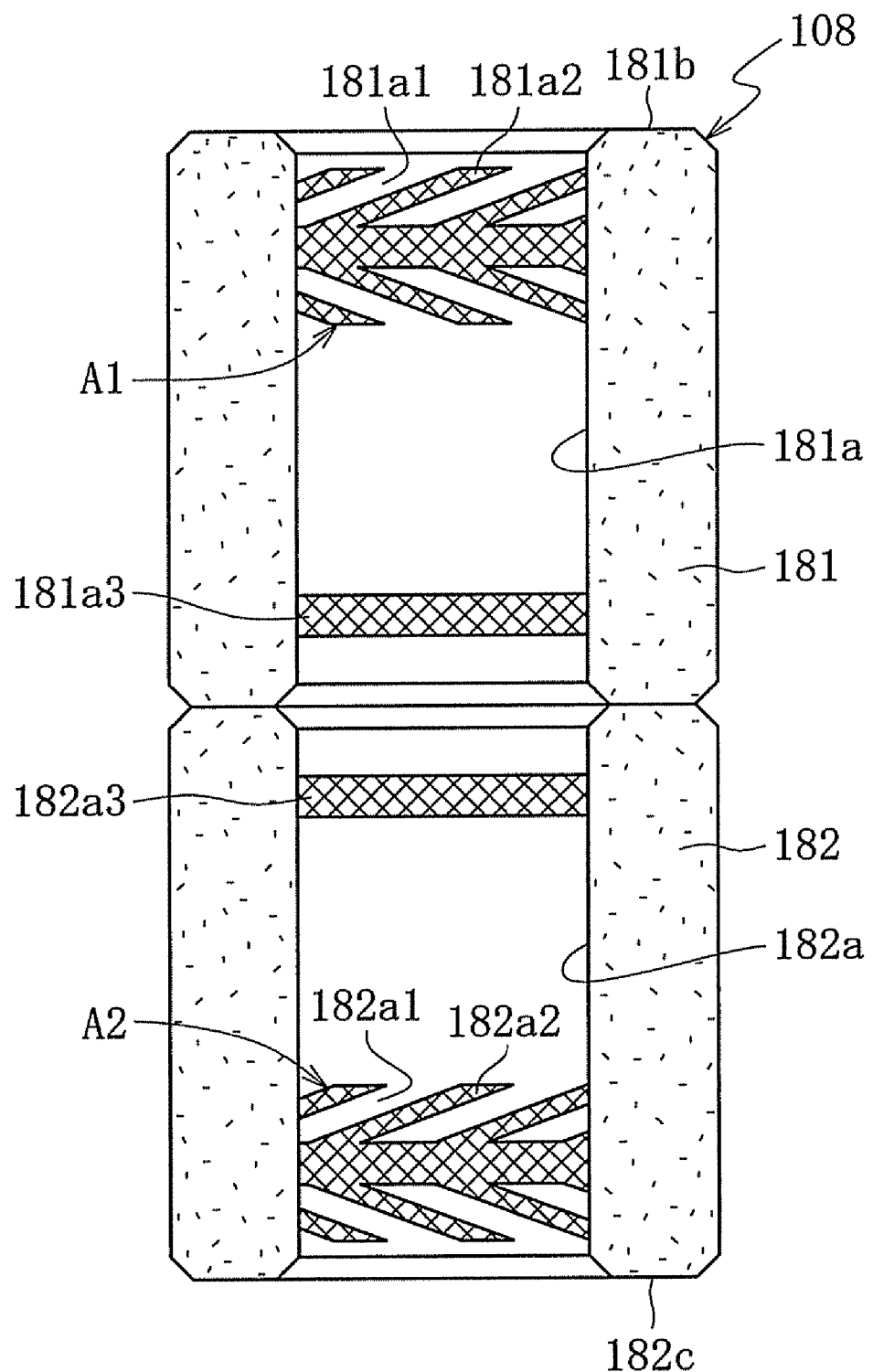
FIG. 12 is a longitudinal sectional view showing another configuration example of the bearing body.

Note that the foregoing description has dealt with the case where the radial bearing surface A1 of the first bearing sleeve 181 is formed at the end farther from the second bearing sleeve 182 (top side), and the radial bearing surface A2 of the second bearing sleeve 182 is at the end farther from the first bearing sleeve 181 (bottom side). In this case, it is sometimes difficult, however, to provide coaxiality between the top and bottom ends of each individual bearing sleeve and between the two bearing sleeves since the bearing sleeves have different inner dimensions between the top and bottom areas. In this case, the foregoing problem can be solved, for example, by forming convex portions 181a3 and 182a3, having generally the same diameter as that of the radial bearing surfaces A1 and A2 (the bank portions 181a2 and 182a2 which define the dynamic pressure generating grooves), at areas axially separated from the respective radial bearing surfaces as shown in FIG. 12.

In this instance, to avoid an increase in torque, the convex portions 181a3 and 182a3 are desirably formed in a band shape having no dynamic pressure generating function as in the shown example. Note that while the shown example has illustrated the case where the convex portions are formed on both the bearing sleeves 181 and 182, a convex portion may be formed on either one of the bearing sleeves alone.

By the way, when the first and second bearing sleeves 181 and 182 have the same axial length as in the foregoing configuration example, operators may accidentally load the sleeves in inverse order when injection molding the housing 107 since the two have little difference in appearance. Then, though not shown in the drawings, the first bearing sleeve 181 and the second bearing sleeve 182 may have different axial lengths in order to avoid human errors of this type.

Up to this point, a detailed description has been given of the first configuration example of the second embodiment of the fluid dynamic bearing device according to the present invention. The present invention is not limited in application to the foregoing configuration example, however. Hereinafter, other configuration examples will be described. In the following description, parts and components having substantially the same configurations and operations as those of the first configuration example will be designated by like reference numerals. A redundant description thereof will be omitted.

Figure 13:
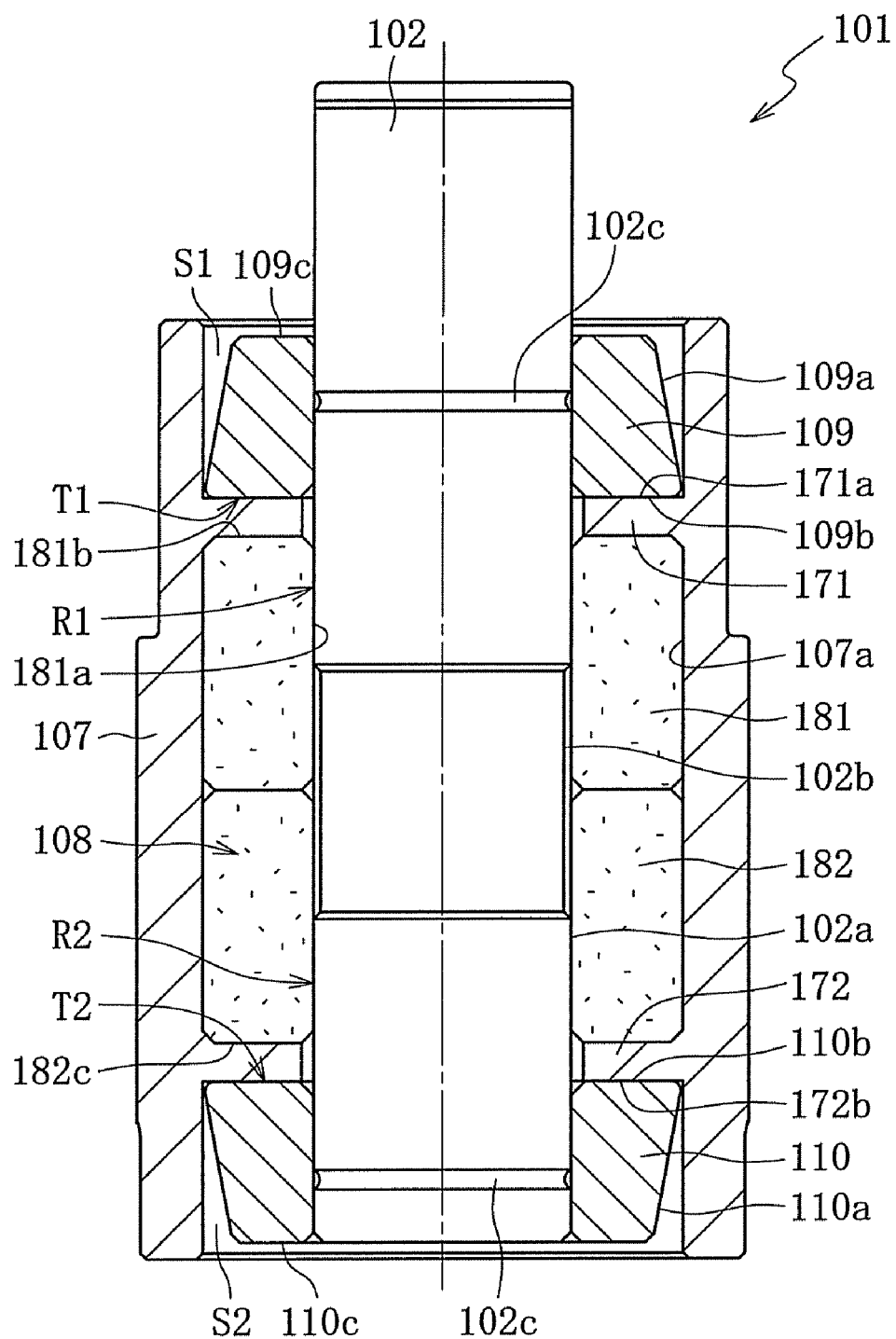
FIG. 13 is a sectional view showing a second configuration example of the fluid dynamic bearing device according to the second embodiment.

FIG. 13 shows a second configuration example of the fluid dynamic bearing device 101 according to the second embodiment. This fluid dynamic bearing device 101 has a configuration different from that of the fluid dynamic bearing device shown in FIG. 10 primarily in that cover parts 171 and 172 for covering the top end 181b of the first bearing sleeve 181 and the bottom end 182c of the second bearing sleeve 182 are formed integrally with the housing 7. In the present configuration example, a first thrust bearing portion T1 is formed between the top end 171a of the cover part 171 and the bottom end 109b of the first flange part 109. A second thrust bearing portion T2 is formed between the bottom end 172b of the cover part 172 and the top end 110b of the second flange part 110.

In the fluid dynamic bearing device 101 having the foregoing configuration, the cover parts 171 and 172 are injection molded integrally with the housing 107, with the bearing body 108 as an insert. In this configuration, the cover parts 171 and 172 can absorb variations, if any, in the axial dimensions of the bearing sleeves 181 and 182. This makes it easier to provide an assembled article of high precision. In other words, the bearing sleeves 181 and 182 each may well have somewhat low molding accuracy (in axial dimensions in particular) while achieving cost reduction.

Since the cover parts 171 and 172 also function as axial retainers for the bearing body 108, an assembled article of even higher bonding strength can be provided easily at low cost.

By the way, the foregoing fluid dynamic bearing device 101 may sometimes cause a local negative pressure in the lubricating fluid that fills the interior of the bearing, and the occurrence of such a negative pressure produces bubbles and vibrations with a drop in bearing performance. This problem can be solved by forming a communicating hole that communicates with both ends of the bearing body 108, thereby providing a circulating channel for the lubricating fluid inside the bearing.

Figure 11:
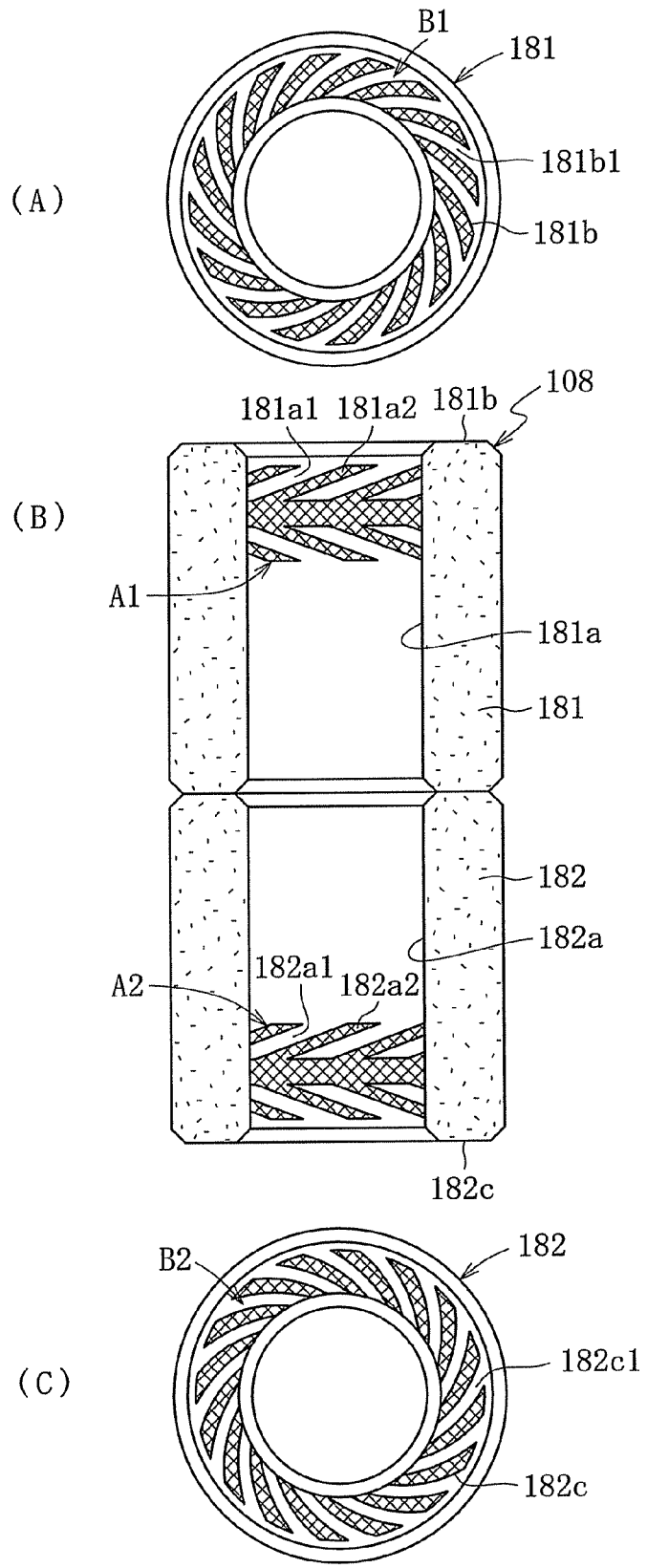
FIG. 11(A) is a view showing the top end of a first bearing sleeve.
FIG. 11(B) is a longitudinal sectional view of a bearing body.
FIG. 11(C) is a view showing the bottom end of a second bearing sleeve.

This type of communicating hole can be formed, for example, by attaching a bearing body having an axial groove onto the housing. Nevertheless, if the housing 107 is injection molded with the bearing body 108 as an insert, as in the present application, the injected material will get into and fills up the axial groove. This situation can be avoided, for example, by injection molding the housing with a pin integral with or separate from the molding die inserted in the axial groove, followed by the pin being pulled out after the molding. Since the communicating hole 112 usually has a hole diameter as small as several hundreds of micrometers or so, however, the pin is likely to break when pulled out. The possibility is even higher for the foregoing configuration where the bearing body 108 has an elongated length in particular. To avoid such a situation, the communicating hole could be increased in diameter. Nevertheless, the top and bottom ends 181b and 182c of the bearing body 108 may be provided with dynamic pressure generating grooves such as shown in FIG. 11, in which case the increased diameter of the communicating hole can reduce the bearing areas with a drop in bearing rigidity.

Figure 14:
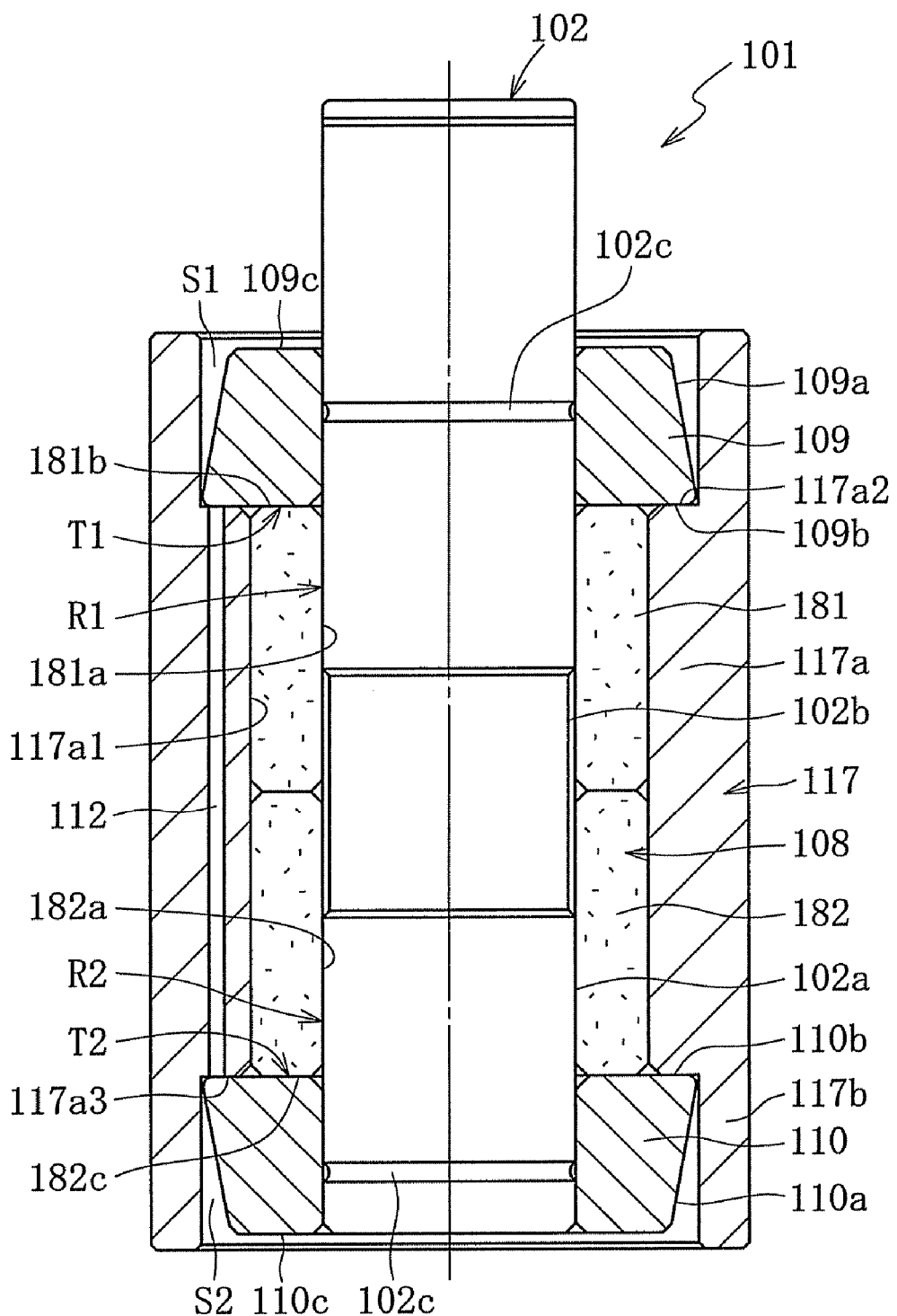
FIG. 14 is a sectional view showing a third configuration example of the fluid dynamic bearing device according to the second embodiment.

FIG. 14 shows an example of the fluid dynamic bearing device 101 that has the communicating hole 112 to communicate with both ends of the bearing body 108, showing a third configuration example of the fluid dynamic bearing device 101 according to the second embodiment of the present application. In view of the foregoing problem with the formation of the communicating hole 112, the fluid dynamic bearing device 101 shown in the diagram is such that a small diameter part 117a protruding more inward than other locations is formed on an axial area of the housing 117 where the bearing body 108 is fixed. The communicating hole 112 is formed in this small diameter part 117a. Since this small diameter part 117a is a location that pertains to neither of the thrust bearing portions T1 and T2, the diameter of the communicating hole can be set relatively freely. Note that while the communicating hole 112 in the shown example is formed in a uniform diameter across its entire axial length, it may be changed in diameter along the axial direction.

Figure 15:
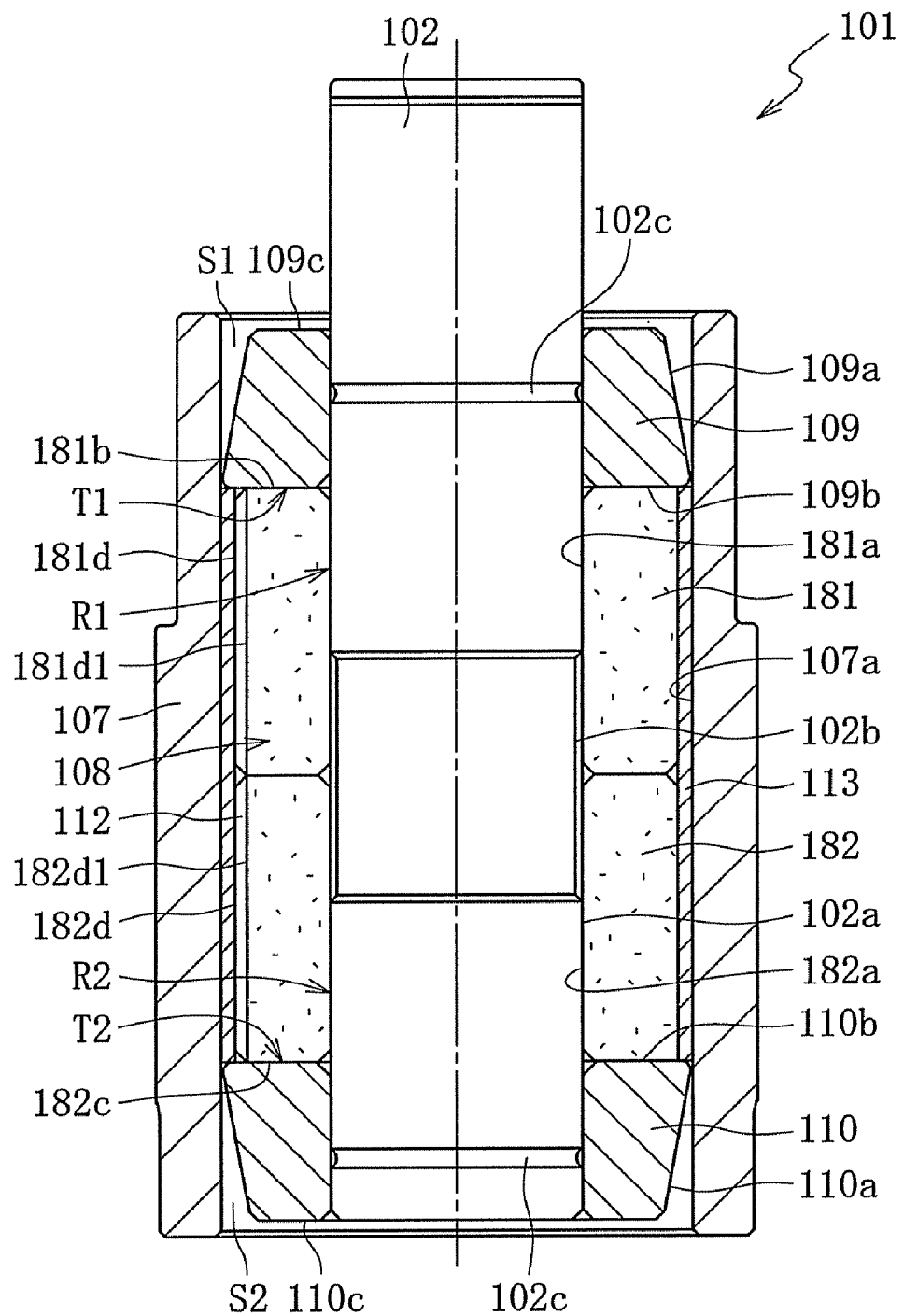
FIG. 15 is a sectional view showing a fourth configuration example of the fluid dynamic bearing device according to the second embodiment.

The foregoing problem with the formation of the communicating hole can also be avoided by not exposing the axial groove to the outer periphery of the bearing body 108, i.e., to surfaces open to the cavity. FIG. 15 shows a concrete example of the countermeasures. In the fluid dynamic bearing device 101 shown in the diagram, an intermediate sleeve 113 is fitted onto the bearing sleeves 181 and 182 which have axial grooves 181d1 and 182d1 in their outer peripheries 181d and 182d, so that this intermediate sleeve 113 and the axial grooves create a communicating hole 112. When injection molding is performed with this assembly as an insert, the openings at both ends of the communicating hole 112 are closed by the dies, preventing the communicating hole 112 from being filled with the injected material. Note that the axial groove may be formed in the inner periphery of the intermediate sleeve 113.

Figure 16:
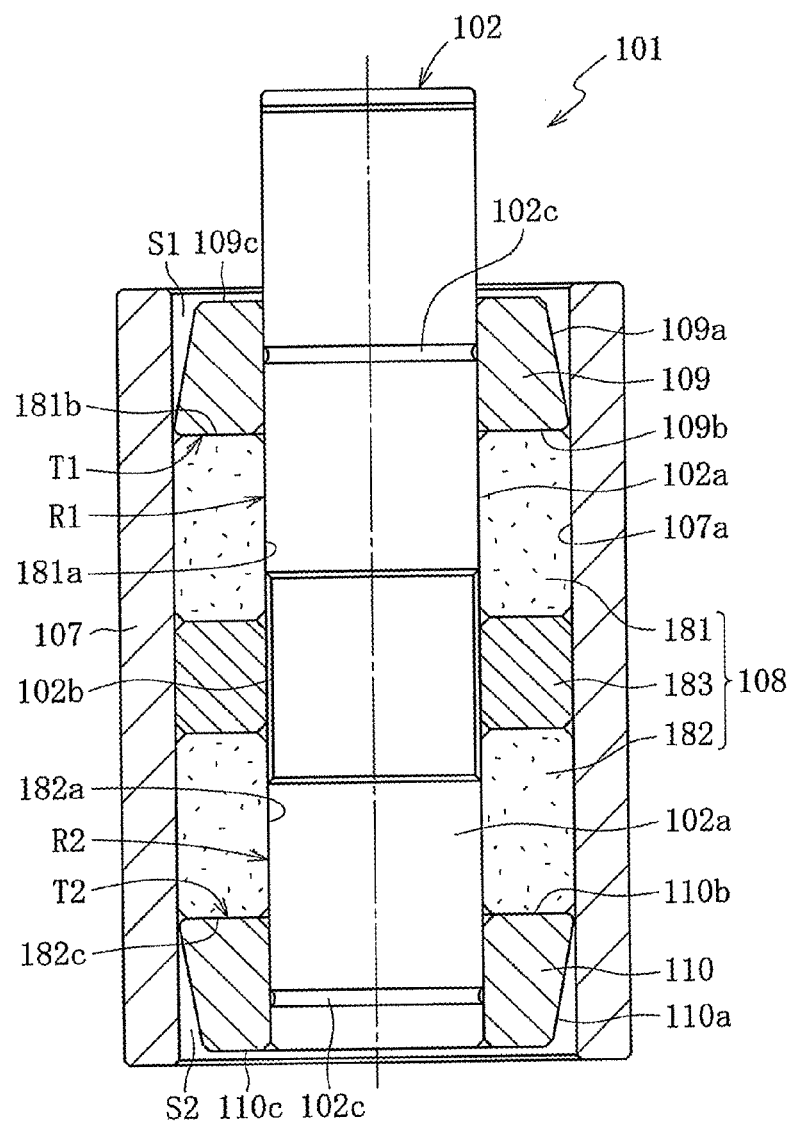
FIG. 16 is a sectional view showing a fifth configuration example of the fluid dynamic bearing device according to the second embodiment.

In the foregoing description, the bearing body 108 is composed of the two bearing sleeves 181 and 182 which are axially arranged in a row. Nevertheless, as shown in FIG. 16, for example, the bearing body 108 may be composed of two bearing sleeves 181 and 182 and a sleeve-like spacer member 183 interposed therebetween. In this case, if the spacer member 183 is made of a nonporous body other than sintered metal (porous body), such as brass, other soft metal materials, other metal materials, and resin materials, then the amount of the lubricating oil can be reduced as much as the spacer member 183 need not be impregnated with. This makes it possible to reduce the axial widths of the seal spaces S1 and S2, allowing axially compact configuration of the fluid dynamic bearing device 101. It will be understood that this configuration can also be employed for the fluid dynamic bearing devices 101 shown in FIGS. 13 to 15.

The foregoing description has dealt with the configurations where the radial bearing portions R1 and R2 and the thrust bearing portions T1 and T2 produce the dynamic pressure effect of the lubricating oil with their dynamic pressure generating grooves of herringbone shape, spiral shape, or the like. The present invention is not limited thereto, however.

For example, though not shown in the drawings, either one or both of the radial bearing portions R1 and R2 may employ, for example, a so-called step bearing in which the area to make the radial bearing surface has a plurality of axial grooves formed at circumferentially regular intervals, or a so-called multilobe bearing in which the area to make the radial bearing surface has a plurality of lobes. Moreover, either one or both of the thrust bearing portions T1 and T2 may employ, for example, a so-called step bearing, a so-called wave bearing (with wave-shaped steps), or the like in which the area to make the thrust bearing surface has a plurality of radial grooves.

The foregoing description has also dealt with the mode where the first radial bearing portion R1 and the second radial bearing portion R2 are both configured as dynamic bearings. Nevertheless, either one or both of the first radial bearing portion R1 and the second radial bearing portion R2 may be configured as a cylindrical bearing. In addition, the thrust bearing portions may be configured as a so-called pivot bearing which supports one end of the shaft member by contact.

The foregoing description has also dealt with the cases where the bearing body 108 is composed of the bearing sleeves 181 and 182 which are axially arranged in two positions, or the bearing sleeves 181 and 182 and the spacer member 183. The bearing body 108, however, may be composed of bearing sleeves which are axially arranged in three or more positions.

In the foregoing description, the lubricating oil has been exemplified as the lubricating fluid to be filled into the interior of the fluid dynamic bearing device 101. Nevertheless, other fluids capable of generating a dynamic pressure effect in the bearing clearances may also be used, including gases such as air, flowable lubricants such as magnetic fluids, and lubricating grease.

The foregoing has dealt with the mode where the fluid dynamic bearing device is built and used in a spindle motor intended for a disk drive. Aside from the spindle motor for information devices, the fluid dynamic bearing devices having the configuration of the present invention may be suitably used in motors that make high-speed rotations and require high moment rigidity, such as a fan motor.

Figure 17:
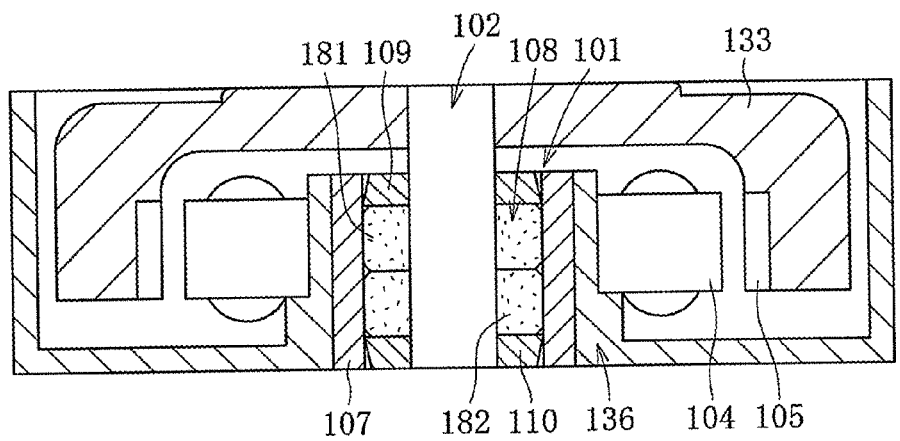
FIG. 17 is a sectional view conceptually showing a fan motor having a built-in fluid dynamic bearing device.

FIG. 17 conceptually shows an example of a fan motor that incorporates a fluid dynamic bearing device according to the present invention, or the fluid dynamic bearing device 101 shown in FIG. 10 in particular, inter alia a so-called radial gap type fan motor in which the stator coils 104 and the rotor magnets 105 are opposed to each other across a radial gap. The motor of the shown example has a configuration different from that of the spindle motor shown in FIG. 9 primarily in that a rotor 133, which is fixed to around the top end of the shaft member 102, has blades on its outer periphery, and that a bracket 136 functions as a casing for accommodating the components of the motor. Since the rest of the components have the same functions and operations as those of the components of the motor shown in FIG. 9, the same reference numerals will be given and redundant description thereof will be omitted.

The invention claimed is:
1. A fluid dynamic bearing device, comprising:
a housing opened at both ends;
a bearing sleeve fixed to an inner periphery of the housing;
a shaft member inserted into an inner periphery of the bearing sleeve;

first and second flange parts formed on the shaft member and disposed on one side and the other side in an axial direction of the bearing sleeve, respectively; and a radial bearing clearance formed between an outer periphery of the shaft member and an inner periphery of the bearing sleeve, seal spaces being formed between an outer periphery of the first flange part and an inner periphery of the housing opposite thereto and between an outer periphery of the second flange part and an inner periphery of the housing opposite thereto, respectively, and oil surfaces of lubricating oil remaining in the seal spaces, wherein the housing is injection molded out of resin with the bearing sleeve as an insert, and two surfaces of the housing which form the seal spaces have an identical diameter.

2. A fluid dynamic bearing device according to claim 1, comprising a cover part for covering at least one end of the bearing sleeve.

3. A fluid dynamic bearing device according to claim 2, wherein a thrust bearing clearance is formed between the cover part and an end of the flange part opposed to the cover part.

4. A fluid dynamic bearing device according to claim 3, wherein a dynamic pressure generating portion is formed in the cover part.

5. A fluid dynamic bearing device according to claim 1, comprising an intermediate member arranged around the bearing sleeve so that the intermediate sleeve forms a communicating hole that communicates with both ends of the bearing sleeve.

6. A fluid dynamic bearing device according to claim 1, wherein thrust bearing clearances are formed between one end face of the bearing sleeve and an end face, opposite thereto, of the first flange part and between the other end face of the bearing sleeve and an end face, opposite thereto, of the second flange part, respectively.

7. A fluid dynamic bearing device, comprising:

a housing;

a bearing body fixed to an inner periphery of the housing;

a shaft member inserted into an inner periphery of the bearing body;

first and second flange parts formed on the shaft member and disposed on one side and the other side in an axial direction of the bearing body, respectively; and a radial bearing portion for supporting the shaft member to be supported radially with an oil film of lubricating oil formed in a radial bearing clearance between an inner periphery of the bearing body and an outer periphery of the shaft member, the bearing body being composed of a plurality of bearing sleeves axially arranged in a row, seal spaces being formed between an outer periphery of the first flange part and an inner periphery of the housing opposite thereto and between an outer periphery of the second flange part and an inner periphery of the housing opposite thereto, respectively, and oil surfaces of lubricating oil remaining in the seal spaces, wherein the housing is an article having openings in both ends, being injection molded out of resin with the bearing body as an insert, and two surfaces of the housing which form the seal spaces have an identical diameter.

8. A fluid dynamic bearing device according to claim 7, wherein a communicating hole that communicates with both ends of the bearing body is provided.

9. A fluid dynamic bearing device according to claim 8, wherein a small diameter part protruding more inward than other locations is formed on an axial area of the housing where the bearing body is fixed, and a communicating hole is formed in this small diameter part.

10. A fluid dynamic bearing device according to claim 8, comprising an intermediate sleeve for accommodating the bearing body, wherein the communicating hole is formed between this intermediate sleeve and the bearing body.

11. A fluid dynamic bearing device according to claim 7, comprising a cover part for covering at least one end of the bearing body.

12. A fluid dynamic bearing device according to claim 7, wherein thrust bearing clearances are formed between one end face of the bearing body and an end face, opposite thereto, of the first flange part and between the other end face of the bearing body and an end face, opposite thereto, of the second flange part, respectively.

* * * * *